United States Patent
Wildfeuer

(12) 
(10) Patent No.: US 6,842,503 B1
(45) Date of Patent: Jan. 11, 2005

(54) SUPPORT OF TTY SYSTEMS IN VOICE OVER DATA NETWORKS

(75) Inventor: Herbert Michael Wildfeuer, Santa Barbara, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 10/653,790

(22) Filed: Sep. 2, 2003

(51) Int. Cl.[7] .................... H04M 11/00; H04L 12/66
(52) U.S. Cl. ........................................ 379/52; 370/352
(58) Field of Search .................. 379/52, 93.05–93.08, 379/90.01, 413.02, 413.03, 413.04; 370/352, 356; 340/825.19

(56) References Cited

U.S. PATENT DOCUMENTS

| | | |
|---|---|---|
| 6,611,804 B1 * 8/2003 | Dorbecker et al. | 704/271 |
| 2004/0008667 A1 * 1/2004 | Michaelis | 370/352 |

OTHER PUBLICATIONS

ITU T (Telecommunication Standardization Sector of ITU) H.323 (Nov. 2000) Series H: Audiovisual and Multimedia Systems, Infrastructure of audiovisual services—Systems and terminal equipment for audiovisual services, "Packet-based multimedia communications systems" (242 pages).

* cited by examiner

*Primary Examiner*—Wing F Chan
(74) *Attorney, Agent, or Firm*—Marger Johnson & McCollom, P.C.

(57) ABSTRACT

A network device for transmitting TTY data across a data network has a PSTN port for receiving PSTN signals and a demodulator for demodulating the PSTN signals into digital data. A processor detects a suspected start bit for TTY data and buffers voice packets while it parses the following data. If the start bit is valid, the buffered data is discarded and the processor packetizes and transmits the TTY data through a data port.

A network device for receiving TTY data extracts TTY data from an incoming data packet stream. The TTY data is then remodulated into PSTN signals and transmitted to the PSTN via a PSTN port.

33 Claims, 3 Drawing Sheets

SUPPORT OF TTY SYSTEMS IN VOICE OVER DATA NETWORKS

BACKGROUND

TTY, text telephony for the deaf, allows hearing impaired people to communicate over Public Switched Telephone Networks (PSTN). Some systems, such as those in the United States, use Frequency Shift Key (FSK) modulation of the tones on the line at relatively slow signaling rates, usually 45 baud, to signal character data. The character data may be encoded in one of many schemes, a common one is Baudot characters. The character data is framed by a start bit and a stop bit, resulting in a 7-bit string for each to character.

The performance of TTY systems in the US is mandated by government regulations for all PSTN networks. Generally, the performance criteria are set out in a character error rate. PSTN networks have to have a limited number of errors per a set time period to stay in compliance with the government regulations.

With the advent of voice over data networks systems, TTY services may suffer. Voice over data network systems typically comprise an ingress device, referred to here as a gateway, that 'translates' the incoming tones of a PSTN phone call from a caller into a data stream that is then packetized and transmitted as data across a data network. An egress device, referred to here as an egress gateway, then re-modulates the data stream into PSTN tones and transmits it across the PSTN to the called party.

Voice over data networks calls will be referred to here as Voice over Internet Protocol (VoIP) for ease of discussion, with no intention of limiting voice over data networks specifically to IP networks. Similarly, while the ingress and egress devices will be referred to here as gateways, no limitation to networks complying with the International Telecommunications Union (ITU) recommendations for multimedia communications systems, such as H.323, is intended.

Data loss and encoding schemes in VoIP networks may result in higher than acceptable error rates for TTY data streams. The higher error rates may result in VoIP systems being noncompliant with government regulations for TTY systems.

SUMMARY

One embodiment of the invention is a network device for transmitting TTY data across a data network. The device has a PSTN port for receiving PSTN signals and a demodulator for demodulating the PSTN signals into digital data. A processor detects a suspected start bit for TTY data and buffers voice packets while it parses the following data. If the start bit is valid, the buffered data is discarded and the processor packetizes and transmits the TTY data through a data port.

Another embodiment of the invention is a network device for receiving TTY data. The TTY data is extracted from an incoming data packet stream by a processor. The TTY data is then remodulated into PSTN signals and transmitted to the PSTN via a PSTN port.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
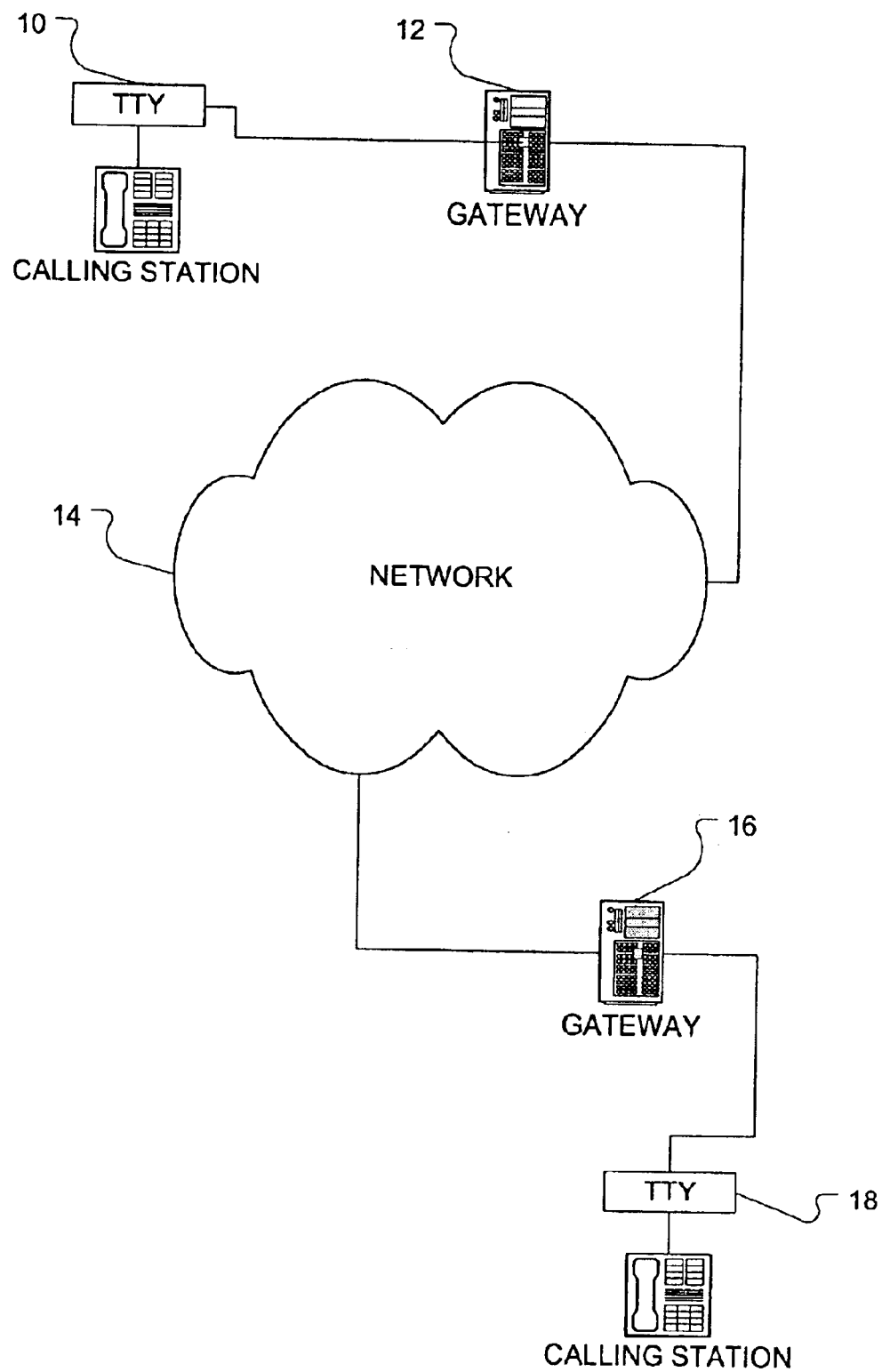
FIG. 1 shows an example of a data network used for providing communications between two TTY devices.

FIG. 1 shows an example of a data network across which may be transmitted TTY (text telephony for the deaf) data. A calling party places a call from a station 10. Station 10 may be a telephone equipped with a TTY attachment, a combination phone and TTY device or just a TTY device, among other configurations. In more advanced configurations, the caller may speak into the phone and the phone converts the speech into text, and then the text is transmitted as a TTY signal.

TTY signals are typically sent across the publicly switched telephone network (PSTN) using frequency shift key (FSK) modulation, within the voice band. When a PSTN network is replaced by a VoIP network, the transport of TTY signals may be affected. VoIP systems typically have packet loss. VoIP systems may also use encoding techniques to encode voice frequencies that result in errors when encoding the FSK tones of TTY signals.

In FIG. 1, the PSTN has been replaced by a VoIP network. As mentioned above, VoIP will be used as a short name for voice of data networks calls, even for networks that are not based upon the Internet Protocol (IP). The call from station 10 enters the data network via a gateway 12. Typically the term 'gateway' refers to a device specific to networks complying with the International Telecommunications Union (ITU) recommendation H.323 "Packet-Based Multimedia Communications Systems." In this context, however, the term will be used to designate any device that converts PSTN signals into a digital data stream that is then transmitted across a data network. Similarly, the term packet as used here refers to any encapsulation of data into discrete sets of data, such as an IP packet, a Frame Relay frame, or an Asynchronous Transfer Mode cell.

The gateway 12 receives the PSTN modulated signals and demodulates them into a digital data stream. The digital data stream is then transmitted across the network 14 to the gateway for the called party 16. The gateway 16 then converts that digital data stream back into PSTN signals and transmits it to the called station 18. Called station 18 may have a configuration similar to station 10, or may be an alternative configuration.

Proper detection of the beginning of a TTY stream within the PSTN signals may raise several issues. The 'start bit' or beginning tone of the FSK-encoded TTY stream may mimic normally voice signals. Essentially, what the gateway may initially determine to be a start-bit of an encoded character set may actually be a sample of voice data encoded such that the bit segment is the same. If the gateway stops encoding the voice stream to encode and transmit the ITY data stream, and the start bit was a 'false' start bit, the data from the voice stream is lost and the quality of service of the network suffers.

Figure 2:
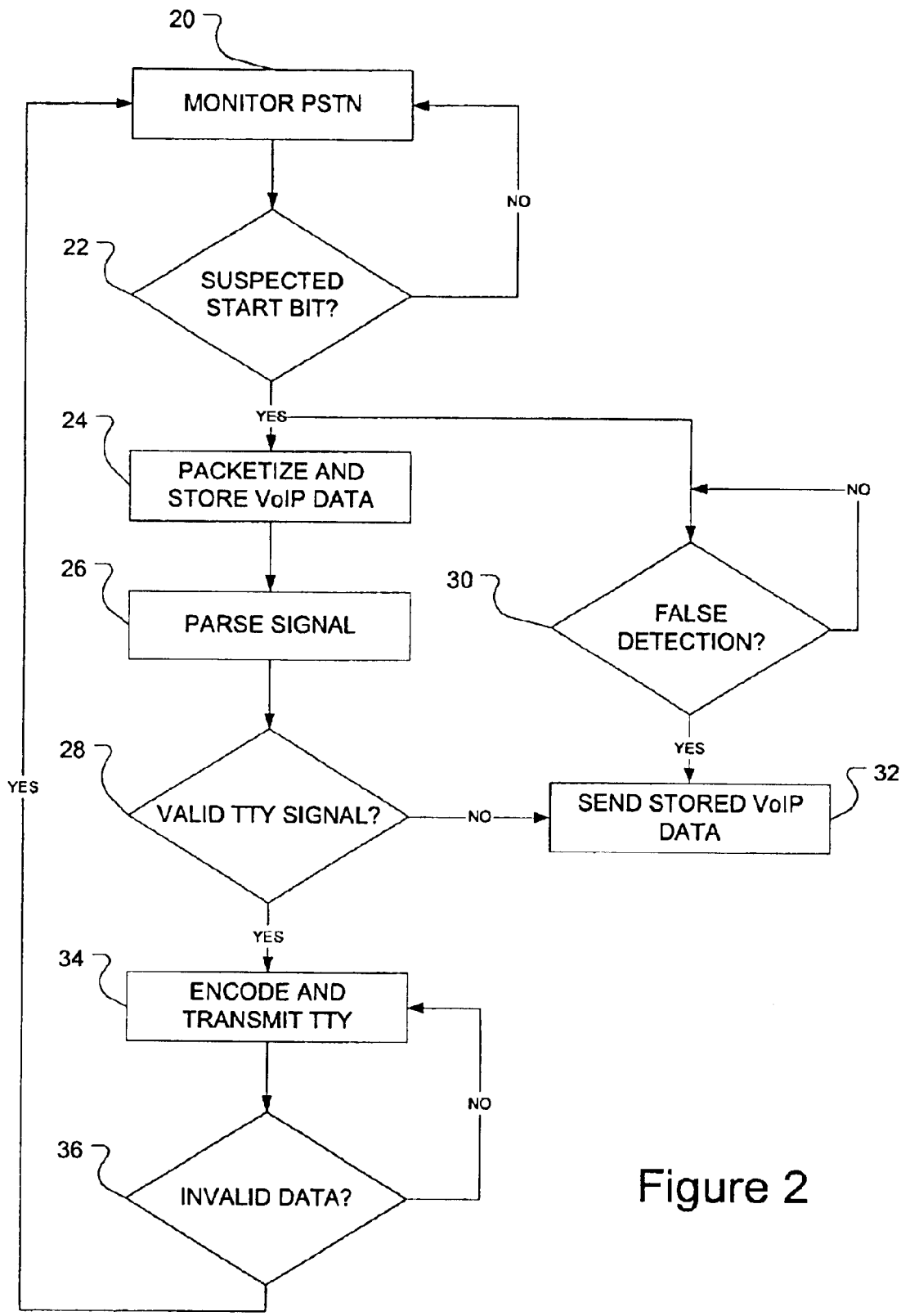
FIG. 2 shows a flowchart of an embodiment of a method to transmit TTY data across a data network.

An embodiment of a method to transmit TTY data across a data network is shown in FIG. 2. The gateway 12 in this example monitors the PSTN signals at 20. When it detects a suspected start bit at 22, it continues to packetize the VoIP data at 24, but also begins to buffer it instead of transmitting the packets into the data network. The incoming signals are parsed at 26 until a determination can be made as to whether or not it is a valid TTY signal at 28. At anytime during the process from 24 through 28, referred to as the verification process, if the gateway determines it was a false detection at 30, the buffered data is transmitted at 32.

The false detection may also be determined at 28, in which case the buffered data is then transmitted at 32. If the TTY signal is valid at 28, the buffered encoded packets are discarded and the TTY data is encoded and transmitted at 34 until an indication that the TTY data has become invalid at 36. Determination of a valid TTY detection may involve looking for validly encoded text characters in the subsequent data. For example, a common TTY encoding technique uses Baudot characters, where the characters indicated by the FSK signals on the PSTN are encoded using a set of 5 bits set out by Emile Baudot in the 1800s. While false detection of a start bit may be frequent, but will not affect performance as the determination of a valid character or not will occur fairly quickly. False detection of an encoded character, as opposed to a start bit, is considered to be of very low probability. The lack of characters in the incoming string will also be fairly easy to detect.

Lack of reception of the stop bit may happen for many reasons, including noise on the line or a break in the signal stream from the PSTN. The gateway may monitor the data to ensure that it is still encoded TTY data, in the eventuality of it 'missing' the stop bit. Once the gateway determines that the data is no longer TTY data, it returns to monitoring the PSTN signal for another start bit and resumes normal voice encoding.

Similarly, if the gateway determines at either 28 or 30 that the start bit was falsely detected, and the buffered voice packets are transmitted, the process returns to monitoring the PSTN signals.

Figure 3:
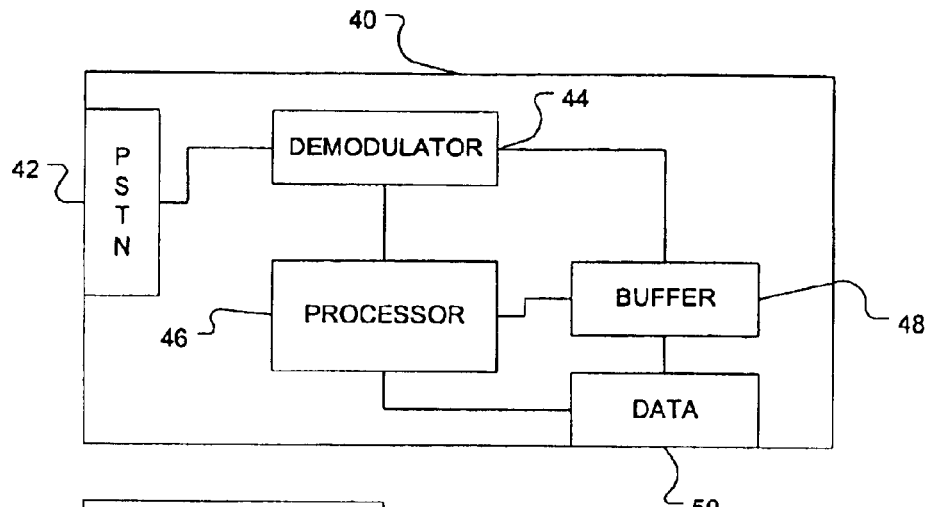
FIG. 3 shows an embodiment of a network device operable to receive PSTN TTY signaling and transmit TTY data.

An embodiment of a gateway, such as 12 of FIG. 1, is shown in FIG. 3. The gateway 40 may have a PSTN port 42 to allow it to receive the PSTN signaling from the calling station. The PSTN signaling is then demodulated by the demodulator 44 and converted into a digital data stream. A processor 46 then takes the digital data stream and packetizes it. The processor also analyzes the data stream to detect a start bit of TTY data.

When TTY data detection is suspected, the processor will send packets to the buffer 48 rather than allow them to be transmitted across the data network. This eliminates the possibility of an encoded TTY character 'leaking' into the encoded voice packets, while preserving the data during the search for encoded TTY characters. Upon detection of a valid character string beginning, the voice packets encoded and stored in the buffer 48 are discarded, typically at the direction of the processor 46.

The transmission of the TTY string may be performed by robust transport mechanisms for the packets, including redundancy, reliable transport protocol, or Forward Error Correction (FEC) techniques. This may increase the robustness of the service for VoIP networks.

Variations on the example above for the ingress gateway are possible. For example, the demodulator may be a part of the processor 46, and the buffer 48 may reside on board the processor as well. The ports 42 and 50 may actually be the same port, or two different interfaces on the same port. The processor may be a general-purpose processor, a digital signal processor, an application specific integrated circuit (ASIC), or a field-programmable gate array (FPGA) as examples. The individual implementations of the various aspects of this device are left to the designer.

Figure 4:
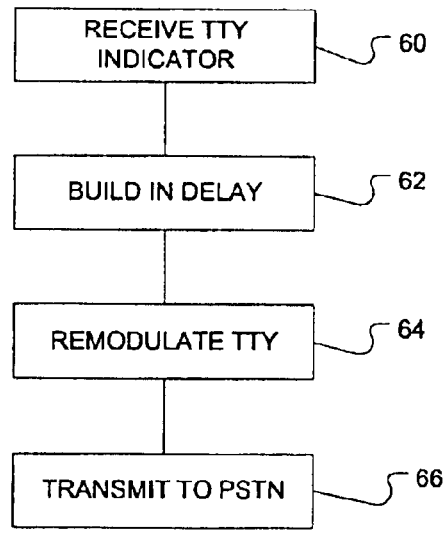
FIG. 4 shows a flowchart of an embodiment of a method to receive TTY data across a data network.

The design of the receiving or egress gateway, such as 18 in FIG. 1, has even more freedom. With the receiving gateway, the determination of valid TTY data has already been made. An embodiment of a process for receiving TTY data across a data network is shown in FIG. 4.

At 60, a data packet including the TTY character data is received. The TTY data is then remodulated into PSTN signals at 64 using a reverse-FSK encoding process. The data is then transmitted to the PSTN line at 66. This process repeats until no more valid TTY is received. Typically, the ingress gateway will transmit a TTY stop bit, even though it may not actually receive a stop indication from the calling station, as discussed above.

A delay at 62 may need to be built in between the reception of the TTY data at 60 and the remodulation of the signal at 64. This will overcome any problems in the data due to network jitter. Jitter can cause packets to be received out of order, with some packets arriving before packets sent previously. In TTY systems, this may cause the character strings to have characters out of order, making the text incomprehensible at the receiving end.

Figure 5:
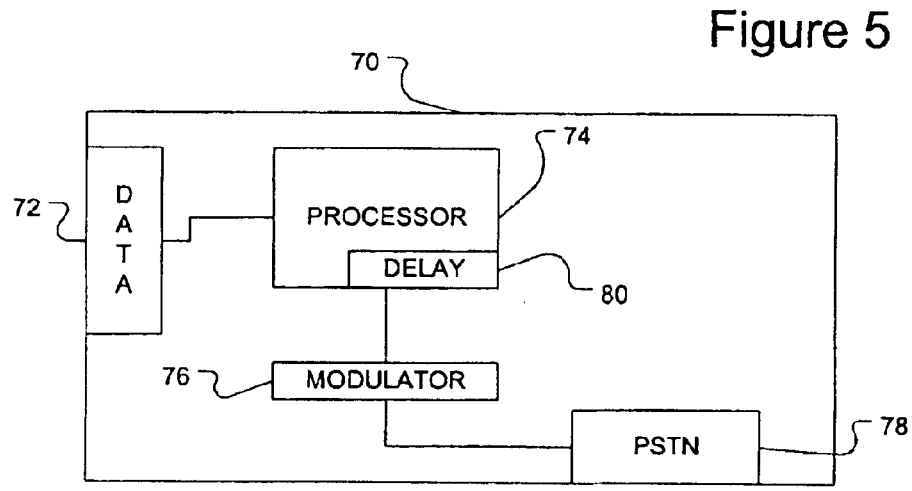
FIG. 5 shows an embodiment of a network device operable to receive TTY data and transmit PSTN TTY signals.

A network device to receive TTY data streams is shown in FIG. 5. The device 70 includes a data part 72 to receive data packets. The processor 74 extracts the data from the packets and identifies the data as TTY data. The TTY data is then remodulated into PSTN signals by modulator 76 and transmitted to the PSTN line through the PSTN port 78.

If a delay is needed, this may be determined by a delay controller 80. The delay controller may determine the length of any delay, if needed, based upon performance characteristics of the network in recent periods. The delay controller is shown as being part of the processor 74, but may be a separate device. Similarly, alternative configurations of the network device as discussed above with regard to the transmitting device may also apply here.

In addition, while the transmitting device of FIG. 3 and the receiving device of FIG. 5 are shown as having different configurations, they may have the same configurations. For example, the modulator of the receiving device and the demodulator of the transmitting device may be a modulator/demodulator. This would allow the devices to transmit data in either direction, from PSTN to the data network, or from the data network to the PSTN. While a buffer is not shown as part of the receiving device of FIG. 5, one may be included in order to allow it to also function as a transmitting device.

Existing devices may implement the embodiments of the invention by means of a software upgrade. In this instance, the invention may be considered to be an article of machine-readable media containing instructions that, when executed, cause the machine to implement the methods of the invention. This would be true for the transmitting device, the receiving device and the either device when validating the TTY signal.

In this manner, transmission of ITY signals may be achieved without a loss of data, which reduces the Quality of Service of the service. If similar government regulations with regard to error rates that are applied to PSTN network are applied to VoIP networks, implementation of embodiments of this invention may allow VoIP networks to achieve the necessary performance.

What is claimed is:

1. A network device, comprising:
   a public switched telephone network port;
   a demodulator to demodulate an incoming public switched telephone network signal stream into a digital data stream;
   a processor to
     detect a start bit of a TTY data stream within the PSTN signal stream;
     perform a verification process on the start bit; and
     convert the digital data stream into data packets during the verification process; and
   a buffer to store the data packets during the verification process.

2. The network device of claim 1, the processor further to direct transmission of data packets not containing TTY data upon failure of the verification process.

3. The network device of claim 1, the processor further to direct discarding of any data packets not containing TTY data upon success of the verification process.

4. The network device of claim 1, the network device further comprising an H.323 gateway.

5. A method of transmitting TTY data across a data network, the method comprising:
   monitoring an incoming PSTN signal stream for a TTY start bit;
   detecting a TTY start indicator;
   determining if the TTY start bit is valid;
   converting the signal stream to data packets while determining if the TTY start bit is valid; and
   storing the data packets.

6. The method of claim 5, the method comprising determining that the TTY start bit is not valid and transmitting the data packets.

7. The method of claim 5, the method comprising determining that the TTY start bit is valid and discarding any data packets not containing TTY data.

8. The method of claim 5, converting the signal stream to data packets further comprising demodulating the TTY signal into a digital data stream and packetizing the digital data stream.

9. A network device, comprising:
   a data port to allow reception of data packets containing TTY data;
   a modulator to modulate the TTY data into PSTN signals; and
   a port to allow transmission of the PSTN signals to a PSTN line.

10. The network device of claim 9, the device further comprising a processor to extract TTY data from the data packets.

11. The network device of claim 9, the device further comprising a delay controller to control a built-in delay between the reception of the TTY data to the PSTN signal.

12. The network device of claim 9, the network device further comprising an H.323 gateway.

13. A method of receiving TTY data, the method comprising:
   receiving at least one data packet containing TTY data;
   modulating the TTY data into PSTN signals; and
   transmitting the PSTN signals to a PSTN line.

14. The method of claim 13, the method comprising controlling a delay period between receiving at least one data packet and modulating the TTY data to account for network jitter.

15. The method of claim 13, modulating the TTY data into PSTN signals further comprising:
   extracting the TTY data from incoming data packets;
   converting the TTY data to PSTN signals.

16. A method to validate a TTY signal, the method comprising:
   detecting a suspected start bit of a TTY signal; and
   parsing subsequent signals to the suspected start bit to determine if the subsequent signals include TTY character data.

17. The method of claim 16, the method comprising determining that the subsequent signals include TTY character data and packetizing the character data for transmission.

18. The method of claim 16, the method comprising determining that the subsequent signals do not include TTY character data and transmitting data a stored during the determining process.

19. A network device, comprising:
   a means for receiving public switched telephone network signals;
   a means for demodulating the public switched telephone network signals into a digital data stream;
   means for detecting a start bit of a TTY data stream within the PSTN signals;
   means for performing a verification process on the start bit;
   means for converting the digital data stream into data packets during the verification process; and
   means for storing the data packets during the verification process.

20. The network device of claim 19 the device comprising means for directing transmission of data packets not containing TTY data upon failure of the verification process.

21. The network device of claim 19, the device comprising means for directing discarding of any data packets not containing TTY data upon success of the verification process.

22. A network device, comprising:
   means for allowing reception of data packets containing TTY data;
   means for modulating the TTY data into PSTN signals; and
   means for allowing transmission of the PSTN signals to a PSTN line.

23. The network device of claim 22, the device further comprising means for extracting TTY data from the data packets.

24. The network device of claim 22, the device further comprising a means for controlling a built-in delay between the reception of the TTY data to the PSTN signal.

25. An article of machine-readable media containing instructions that, when executed cause the machine to:
   monitor an incoming PSTN signal stream for a TTY start bit;
   detect a TTY start indicator;
   determine if the TTY start bit is valid;
   convert the signal stream to data packets while determining if the TTY start bit is valid; and
   store the data packets.

26. The article of claim 25 containing instructions that, when executed, cause the machine to determine that the TTY start bit is not valid and transmitting the data packets.

27. The article of claim 25 containing instructions that, when executed, cause the machine to determine that the TTY start bit is valid and discarding any data packets not containing TTY data.

28. An article of machine-readable media containing instructions that, when executed cause the machine to:

receive at least one data packet containing TTY data;

modulate the TTY data into PSTN signals; and transmit the PSTN signals to a PSTN line.

29. The article of claim 28 containing instructions that, when executed, cause the machine to control a delay period between receiving at least one data packet and modulating the TTY data to account for network jitter.

30. The article of claim 28 the instructions that, when executed, cause the machine to modulate the TTY data into PSTN signals further causes the machine to:

extract the TTY data from incoming data packets; and convert the TTY data to PSTN signals.

31. An article of machine-readable media containing instructions that, when executed cause the machine to:

detect a suspected start bit of a TTY signal; and parse subsequent signals to the suspected start bit to determine if the subsequent signals include TTY character data.

32. The article of claim 31 containing instructions that, when executed, cause the machine to determine that the subsequent signals include TTY character data and packetizing the character data for transmission.

33. The article of claim 31 containing instructions that, when executed, cause the machine to determining that the subsequent signals do not include TTY character data and transmitting data a stored during the determining process.

* * * * *

UNITED STATES PATENT AND TRADEMARK OFFICE
CERTIFICATE OF CORRECTION

PATENT NO. : 6,842,503 B1
DATED : January 11, 2005
INVENTOR(S) : Wildfeuer

It is certified that error appears in the above-identified patent and that said Letters Patent is hereby corrected as shown below:

Column 1,
Line 14, replace "each to character" with -- each character --.

Column 2,
Line 60, replace "the ITY data stream" with -- the TTY data stream --.

Column 4,
Line 60, replace "transmission of ITY signals" with -- transmission of TTY signals --.

Signed and Sealed this

Thirty-first Day of January, 2006

JON W. DUDAS
*Director of the United States Patent and Trademark Office*